United States Patent
Ishizuka et al.

[11] Patent Number: 5,956,140
[45] Date of Patent: *Sep. 21, 1999

[54] DISPLACEMENT DETECTION APPARATUS AND DRIVE CONTROL APPARATUS USING THE SAME CONSTRUCTED TO PREVENT COLLISION BETWEEN GRATINGS

[75] Inventors: Kou Ishizuka, Omiya; Takayuki Kadoshima, Utsunomiya, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/604,384

[22] Filed: Feb. 21, 1996

[30] Foreign Application Priority Data

Feb. 21, 1995 [JP] Japan ................................. 7-032195
May 30, 1995 [JP] Japan ................................. 7-157207

[51] Int. Cl.$^6$ ................................................. G01B 9/02
[52] U.S. Cl. ..................... 356/356; 356/354; 250/237 G
[58] Field of Search ................... 356/345, 356, 356/354; 250/237 G

[56] References Cited

U.S. PATENT DOCUMENTS

| | | | |
|---|---|---|---|
| 5,283,434 | 2/1994 | Ishizuka et al. | 250/237 G |
| 5,390,022 | 2/1995 | Ishizuka et al. | 356/356 |
| 5,448,358 | 9/1995 | Ishizuka et al. | 356/373 |
| 5,481,106 | 1/1996 | Nyui et al. | 250/237 G |
| 5,483,377 | 1/1996 | Kaneda et al. | 359/566 |
| 5,498,870 | 3/1996 | Ishizuka | 250/237 G |
| 5,569,913 | 10/1996 | Ishizuka et al. | 356/356 |

FOREIGN PATENT DOCUMENTS 7-83612  3/1995  Japan .

*Primary Examiner*—Robert H. Kim
*Attorney, Agent, or Firm*—Fitzpatrick, Cella, Harper & Scinto

[57] ABSTRACT

An apparatus for obtaining displacement information relative to a member includes a light source for illuminating a phase type diffraction grating on the member, an amplitude grating arranged at the position where interference fringes are generated immediately after emerging of diffracted light from the phase type diffraction grating illuminated by the light source, and a light-receiving element for receiving light emerging from the amplitude grating. The light-receiving element generates a periodic signal as displacement information upon relative movement of the member.

29 Claims, 12 Drawing Sheets

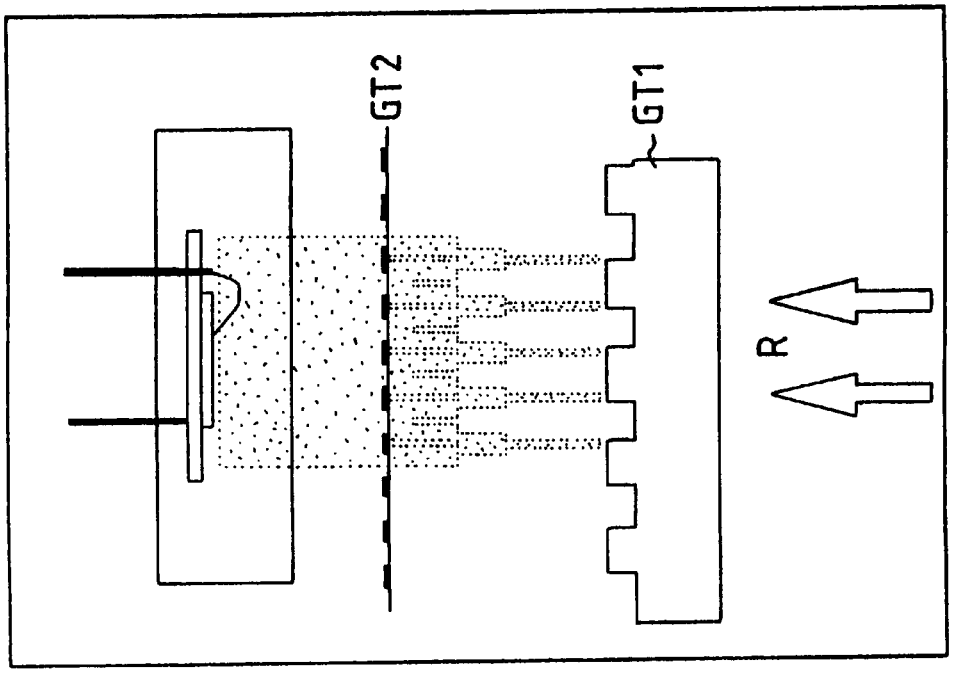
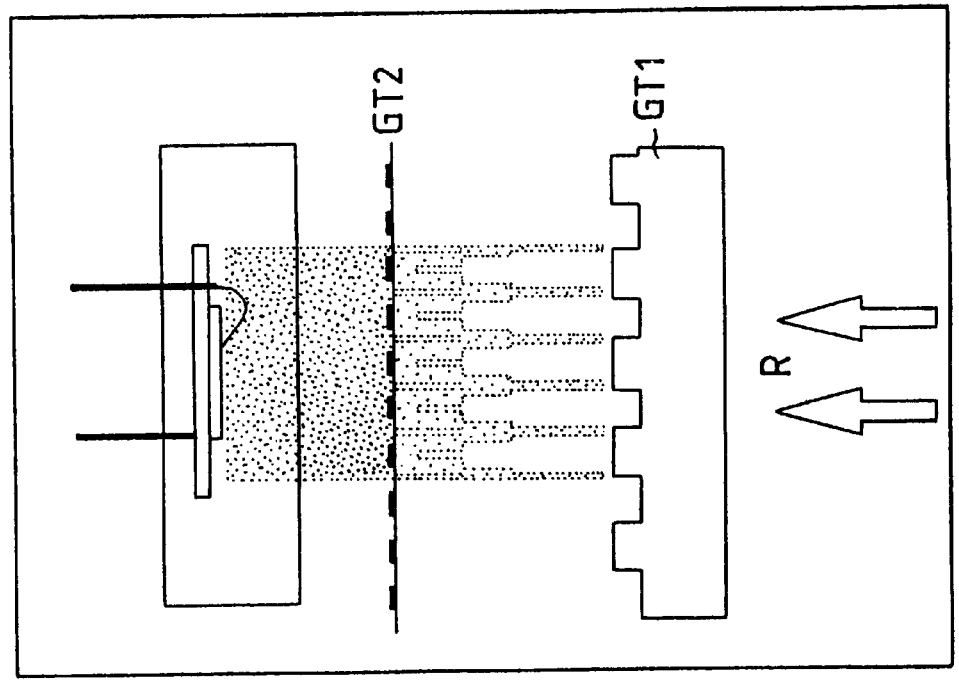

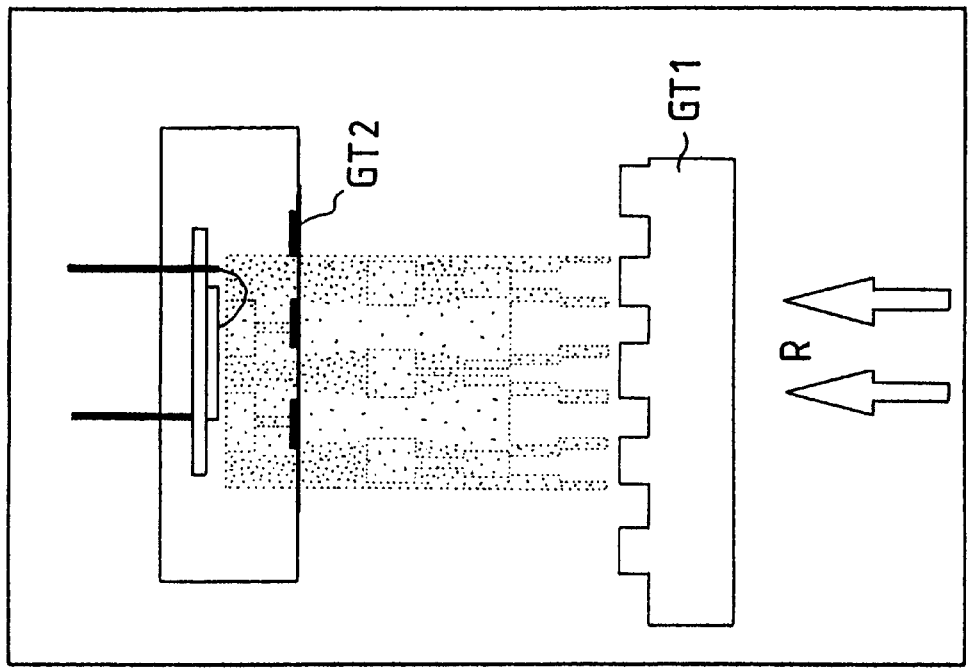
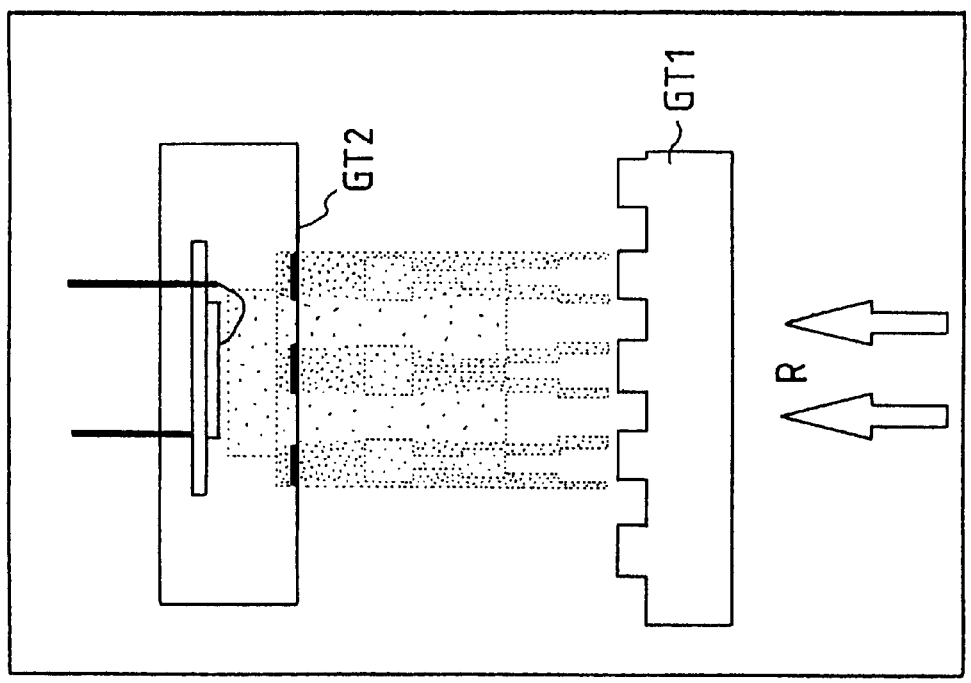

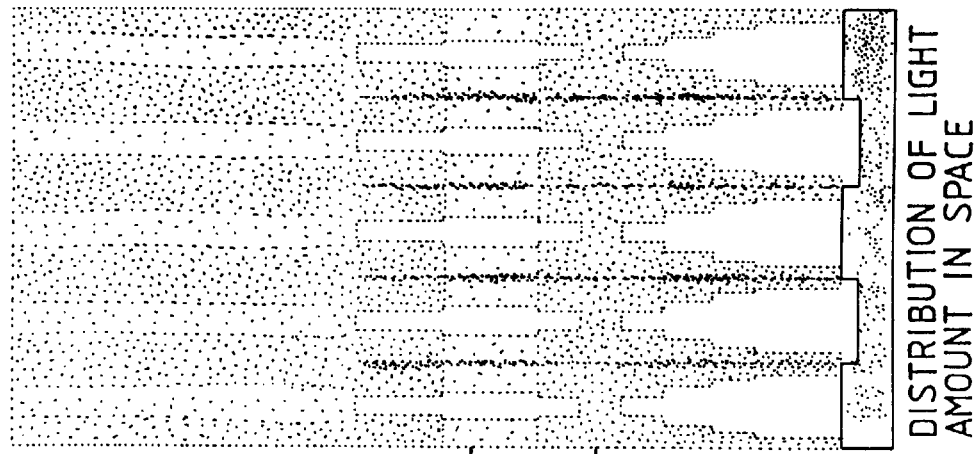
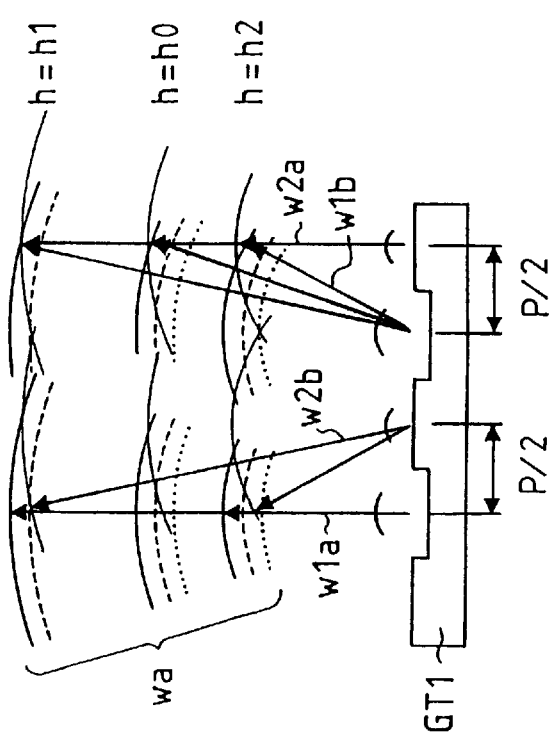

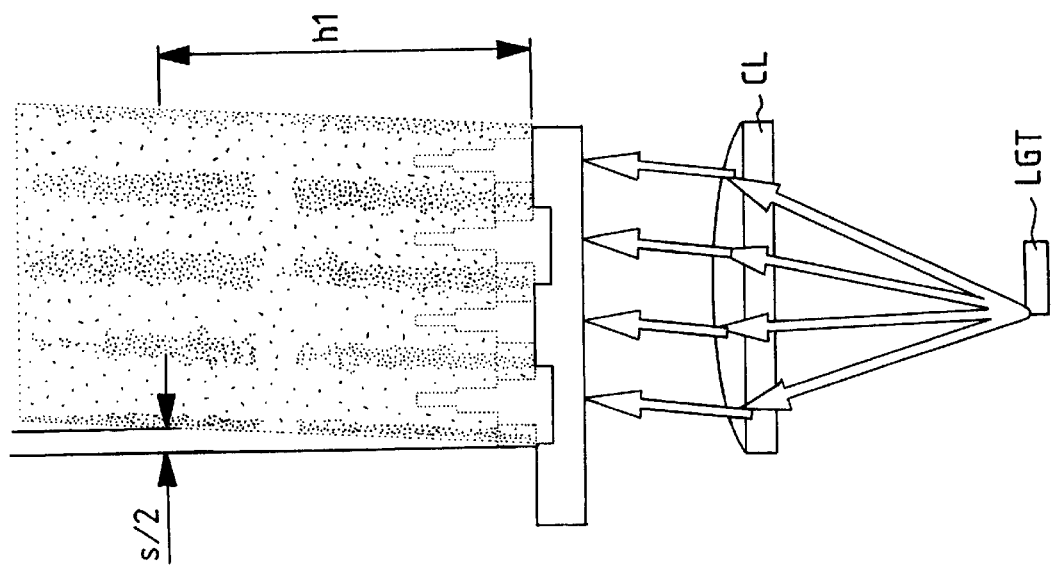
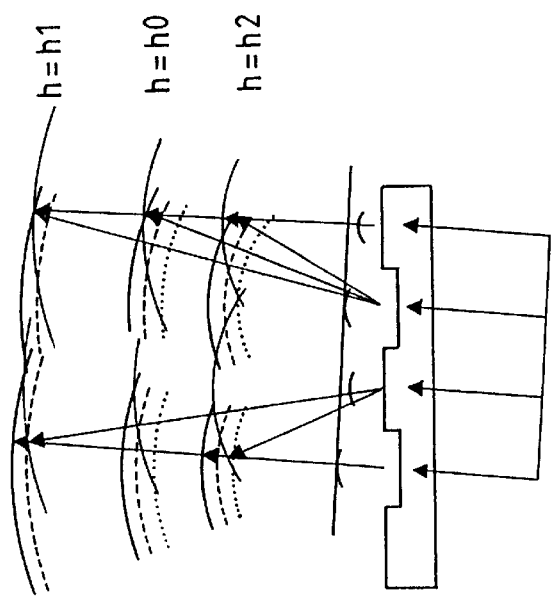

DISPLACEMENT DETECTION APPARATUS AND DRIVE CONTROL APPARATUS USING THE SAME CONSTRUCTED TO PREVENT COLLISION BETWEEN GRATINGS

BACKGROUND OF THE INVENTION

1. Field of the Invention

The present invention relates to an apparatus for detecting relative displacement information and a drive control apparatus using the same. The present invention can be suitably applied to an encoder for detecting the position, position deviation amount, position deviation direction, speed, acceleration, or the like, of a scale by irradiating a light beam onto a diffraction grating on the scale attached to a relatively moving object, and detecting signal light modulated by the surface wavefront phase intensity obtained therefrom.

2. Related Background Art

Conventionally, an incremental encoder is utilized for the purpose of measuring the deviation information (deviation amount, speed, acceleration, or the like) of an object with high precision.

In a typical conventional incremental encoder, a light beam is irradiated onto an amplitude grating (contrast grating) which is recorded on a relatively moving scale and has a pitch on the order of 100 microns, and the light transmitted through the grating is transmitted through an amplitude grating having a pitch equal to that of the grating on the scale, thereby modulating the light beam so that the transmitted light is maximized when the transmission portions of the two gratings overlap each other, and the transmitted light is minimized when the two gratings overlap each other with a shift corresponding to a ½ pitch. In this manner, a change in amount of light for one period upon movement by one pitch of the scale grating is generated, and is detected by a photoelectric element to count the periods, thereby outputting an incremental encoder signal. The measurement resolution equals the grating pitch.

The recent trend is to require a higher resolution of an encoder. However, when an encoder is arranged based on the above-mentioned principle, the grating pattern of light transmitted through the first grating is blurred due to the diffraction phenomenon of light, and it becomes difficult to obtain intensity modulation of light amount when transmitted light is obtained by superposing the second grating. Thus, in order to eliminate the influence of the diffraction phenomenon of light, the first and second gratings approach each other as much as possible.

In order to further increase the resolution of an encoder (for example, grating pitch=10 $\mu$m), the distance between the first and second gratings must be reduced to about several 10 $\mu$m.

However, since the movement of the relatively moving scale is restricted by stages constituted by various guide mechanisms, the first and second gratings may collide against and damage each other due to errors of the mechanism parts.

SUMMARY OF THE INVENTION

The present invention has been made in consideration of the above-mentioned prior art, and has as its object to provide a displacement information detection apparatus which can attain high resolution while preventing collision between gratings, and a drive control apparatus using the same.

Other objects of the present invention will become apparent from the following description of the embodiments.

BRIEF DESCRIPTION OF THE DRAWINGS

FIGS. 3A and 3B are views for explaining the states of intensity signal light;

FIGS. 4A and 4B are views for explaining the states of intensity signal light in an encoder according to the second embodiment of the present invention;

FIGS. 9A and 9B are explanatory views of generation of an intensity distribution due to light transmitted through a phase grating shown in FIG. 8;

FIGS. 10A and 10B are explanatory views of generation of an intensity distribution due to light transmitted through the phase grating shown in FIG. 8;

DESCRIPTION OF THE PREFERRED EMBODIMENTS

Figure 1:
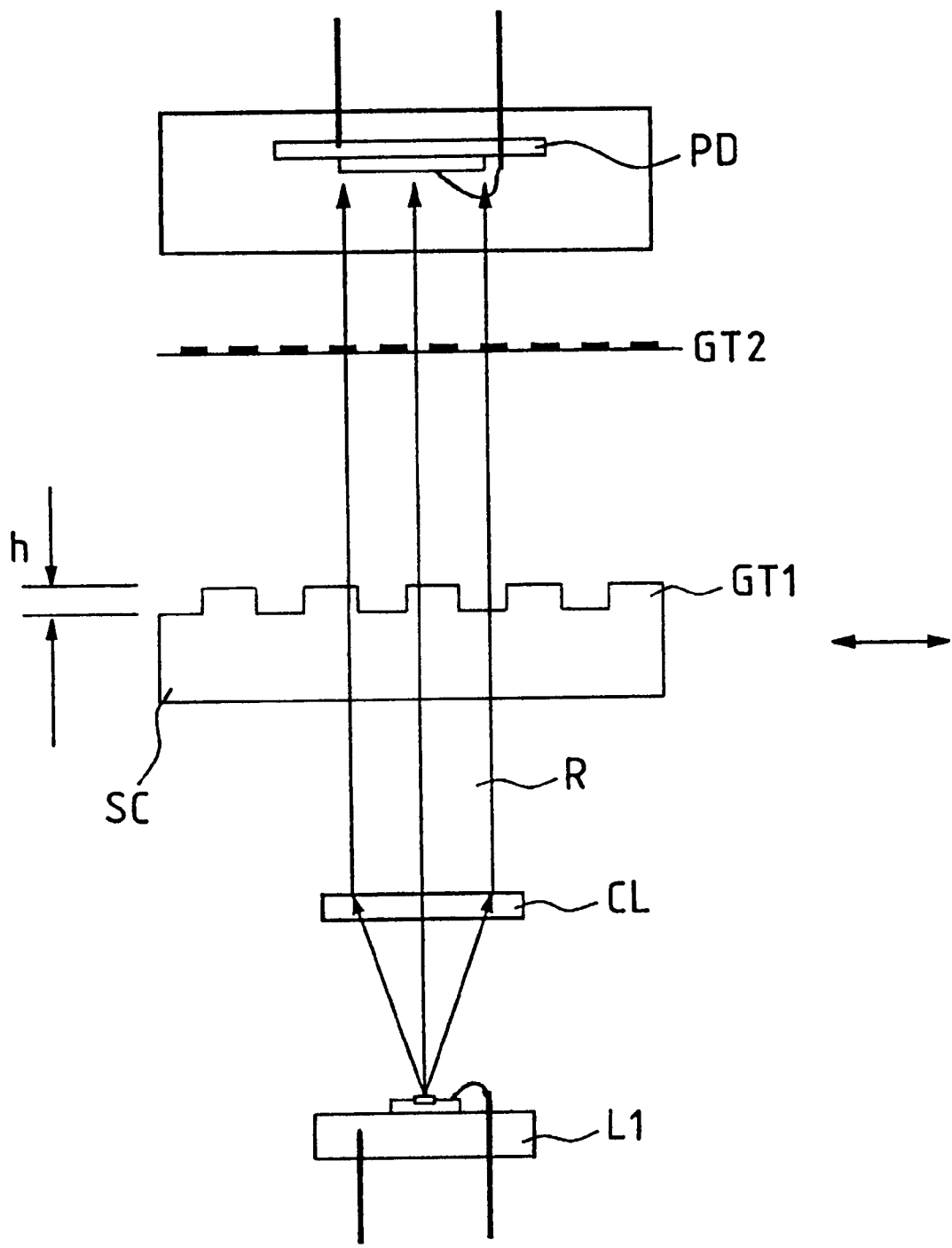
FIG. 1 is an explanatory view of an encoder according to the first embodiment of the present invention.

FIG. 1 is an explanatory view of an encoder according to the first embodiment of the present invention. Referring to FIG. 1, the encoder comprises a light source L1 such as an LED, a collimator lens CL, a scale SC constituted by a transparent member, a transmission type phase diffraction grating (transmission phase grating) GT1 arranged on the scale SC, an amplitude grating GT2, and a light-receiving element PD. The light source L1, the collimator lens CL, the amplitude grating GT2, and the light-receiving element PD are fixed and disposed on the apparatus main body side (not shown), and the scale SC is fixed and arranged on an object (not shown), the rotation, relative to the apparatus main body, of which is to be detected. The transmission phase grating GT1 has a grating layout extending along the relative rotation direction of the scale SC.

A light beam emitted by the light source L1 such as an LED is converted into a collimated light beam R by the collimator lens CL, and the collimated light beam is irradiated onto the relatively rotating scale SC.

On the scale SC, the light beam transmission type phase diffraction grating (to be referred to as a transmission phase grating) GT1 is recorded at a grating pitch P1. The sectional shape of the phase grating corresponds to that of a lamellar grating, and the ratio of its concave and convex portions is 1:1. In this structure, a step h of the concave and convex portions is set to satisfy $h=\lambda/(2\times(n-1))$ (where n is the refractive index of the constituting material and $\lambda$ is the wavelength of the light source). Note that the amounts of light transmitted through the concave and convex portions are equal to each other.

The collimated light beam transmitted through the transmission phase grating GT1 is diffracted by the concave and convex portions of the transmission phase grating GT1, thus modulating the phase of the surface wavefront.

Figure 2:
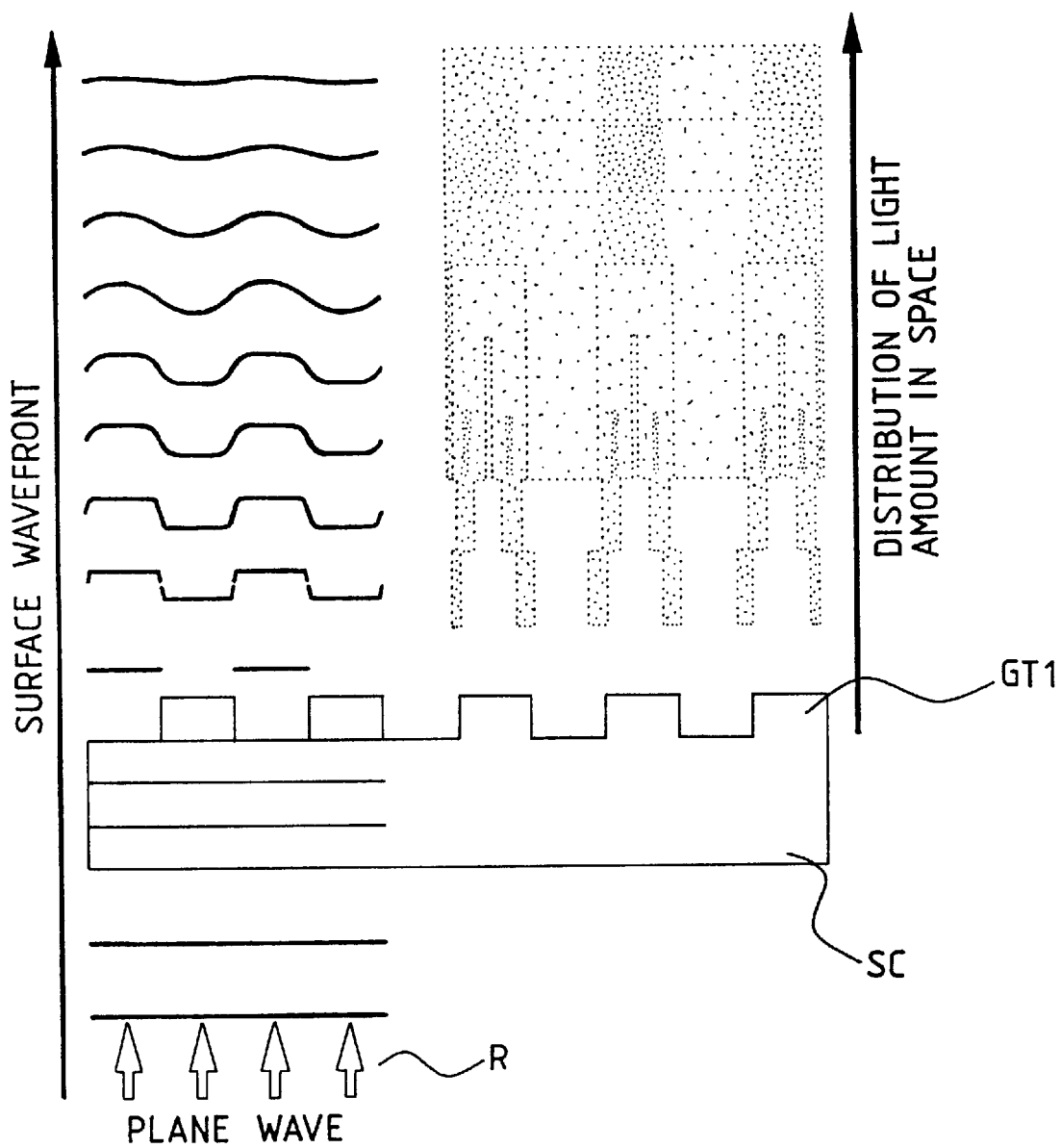
FIG. 2 is an explanatory view showing the diffraction state.

FIG. 2 is an explanatory view showing this diffraction state. Referring to FIG. 2, the left portion illustrates the shapes of the surface wavefront by lines, and the right portion illustrates the distribution of light amount due to a change in surface wavefront by gradation densities. As shown in FIG. 2, as the light beam is separated far away from the grating GT1, phase discontinuous portions smoothly connect due to diffraction phenomenon, and light beams from the concave and convex portions locally interfere with each other. As a result, low light amount portions are periodically generated in upper portions of the phase discontinuous portions.

As the transmitted light beam is separated far away from the grating GT1, phase discontinuous portions smoothly connect due to diffraction phenomenon, light beams from the concave and convex portions interfere each other frequently, and clear low light amount portions are regularly generated in upper portions of the phase discontinuous portions. The grating pitch of this contrast pattern is half the grating pitch P1 of the phase grating GT1.

When the light beam is separated farther away from the grating GT1, phase discontinuous portions smoothly connect due to diffraction phenomenon, light beams from the concave and convex portions interfere each other frequently, and low light amount portions in the upper portions of the phase discontinuous portions weaken. Then, the pitch of the contrast pattern becomes equal to the grating pitch P1 of the phase grating GT1.

When the transmission type amplitude phase diffraction grating (to be referred to as an amplitude grating hereinafter) GT2 (slit grating) having a grating pitch P2=P1/2 is arranged in a space where the intensity pattern is generated by the grating GT1 and having a half pitch of the grating pitch P1, light transmitted through this amplitude grating GT2 becomes a contrast signal light upon rotation of the scale SC. Two periods of change in contrast occur per movement P1 of the scale.

FIGS. 3A and 3B are views for explaining this state. For explanation purposes, FIGS. 3A and 3B illustrate gratings having sizes considerably larger than actual ones. FIG. 3A illustrates a case wherein a brightness signal is generated when many light components of the light beam are transmitted through the amplitude grating GT2, and FIG. 3B illustrates a case wherein a darkness signal is generated when many light components of the light beam are shielded by the amplitude grating GT2. The light amounts of the respective portions are expressed by gradation densities.

For example, if the grating pitch P1 of the scale is 20 $\mu$m, and the grating pitch P2 of the stationary grating is 10 $\mu$m, an encoder having a resolution of 10 $\mu$m is realized. At this time, since the gap between the scale and the stationary grating can be set to be about 200 $\mu$m, collision during relative movement of the scale hardly occurs.

As described above, the contrast signal light of the light transmitted through the amplitude grating GT2 upon movement of the scale is received by the light-receiving element PD to obtain a periodic signal. The periodic signal is subjected to known signal processing in a signal processing system (not shown), thus obtaining a displacement signal with a resolution of 10 $\mu$m.

FIGS. 4A and 4B are views for explaining the states of contrast signal light upon rotation of the scale SC in an encoder according to the second embodiment of the present invention as in FIGS. 3A and 3B. FIG. 4A shows a case wherein a brightness signal is generated when many light components of the light beam are transmitted through the amplitude grating GT2, and FIG. 4B shows a case wherein a darkness signal is generated when many light components of the light beam are shielded by the amplitude grating GT2. Other arrangements are the same as those in the first embodiment, and a detailed description thereof will be omitted.

In this embodiment, the transmission amplitude grating (slit grating) having a grating pitch P2=P1 is arranged in a space where there is an intensity pattern generated by the grating GT1 and having the same pitch as the grating pitch P1. In this case, one period of change in contrast of the contrast signal light of the transmitted light occurs per movement P1 of the scale.

For example, if the grating pitch P1 of the scale is 10 $\mu$m, and the grating pitch P2 of the stationary grating is 10 $\mu$m, an encoder having a resolution of 10 $\mu$m is realized. At this time, since the gap between the scale and the stationary grating can be set to be 200 $\mu$m or more, collision during relative movement of the scale hardly occurs as in the first embodiment.

Figure 5:
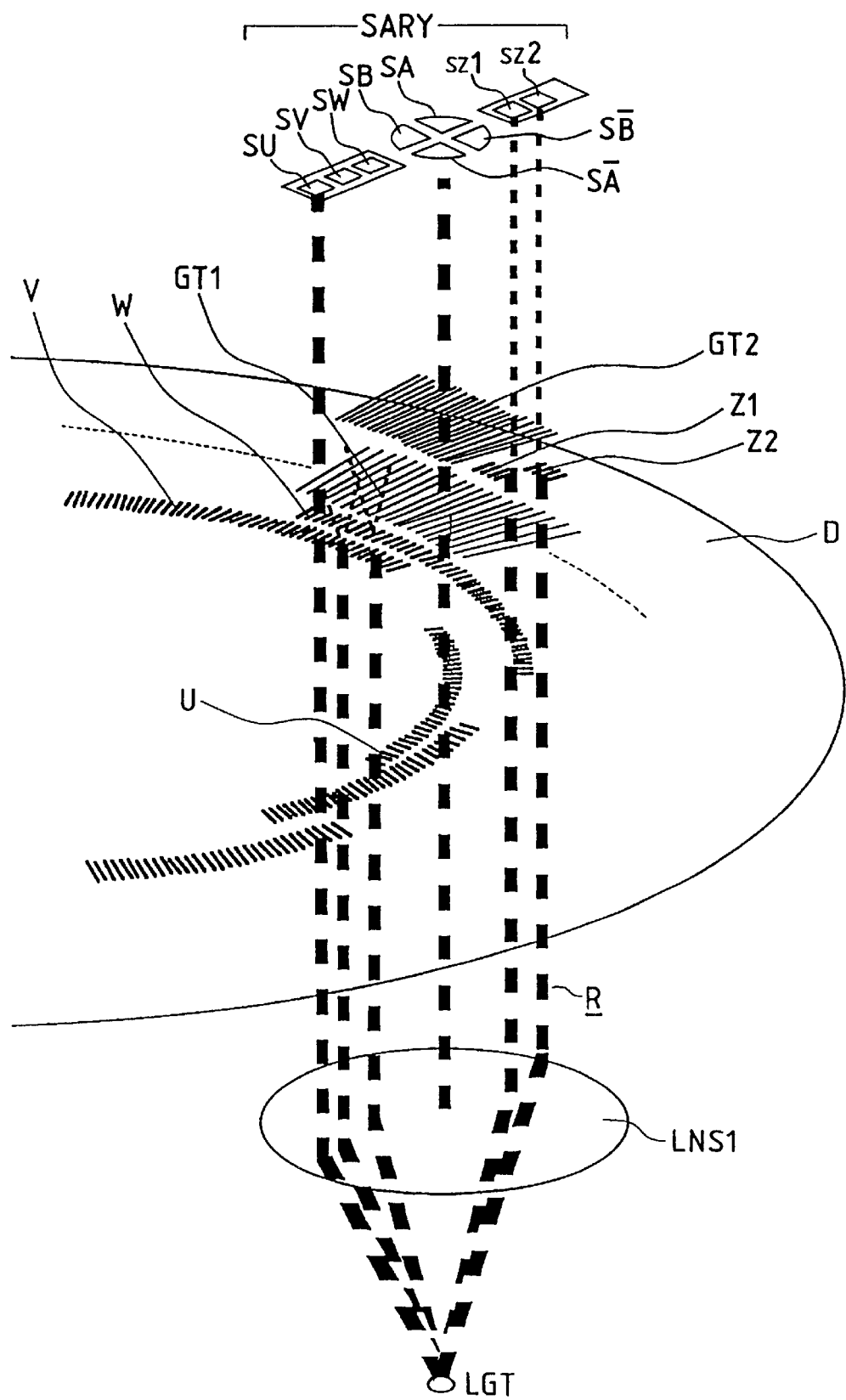
FIG. 5 is a view showing the optical layout of a rotary encoder according to the third embodiment of the present invention.
Figure 6:
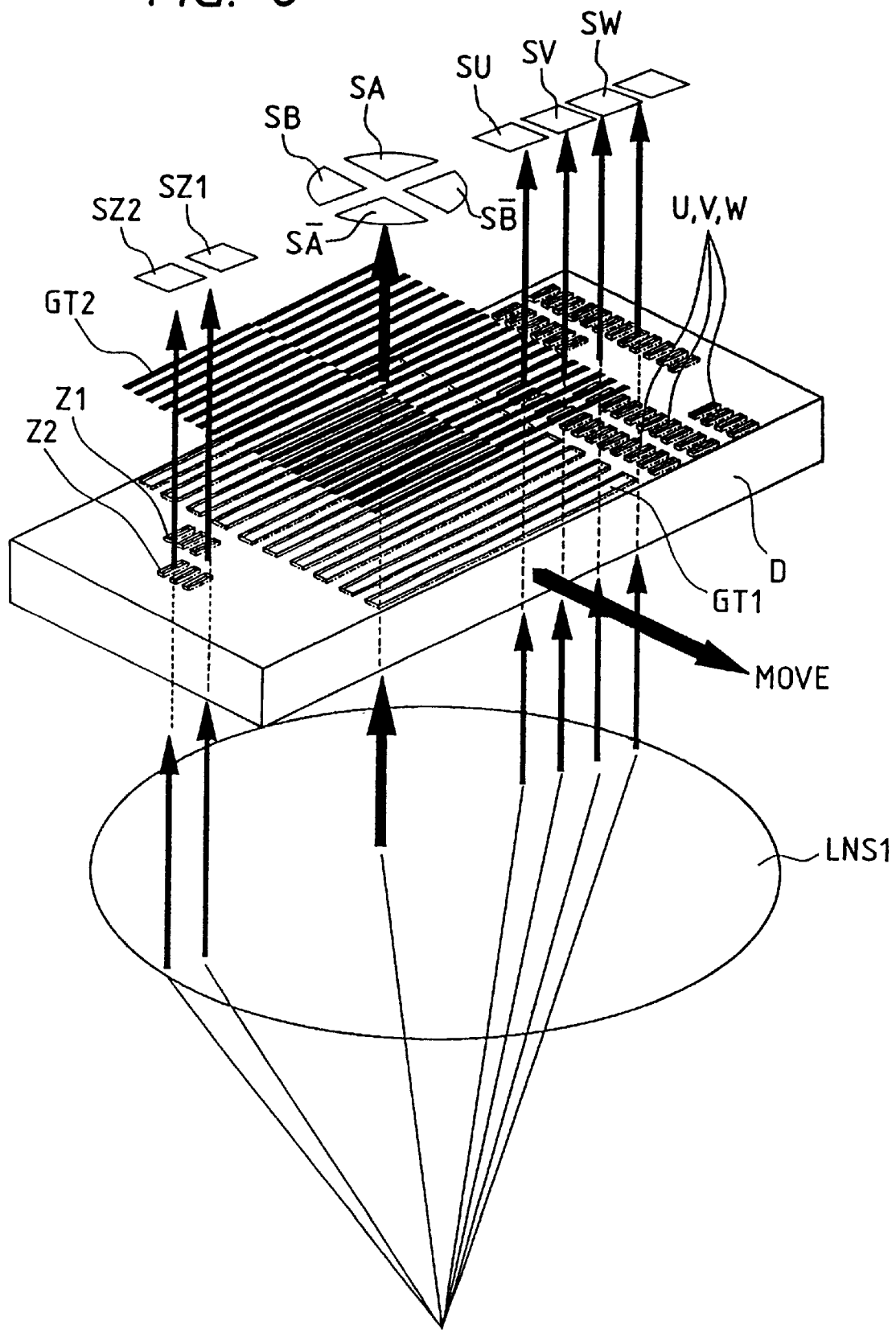
FIG. 6 is a view showing the propagation routes of light rays.

FIG. 5 is a view showing the optical arrangement of a rotary encoder according to the third embodiment of the present invention, and FIG. 6 is a schematic view showing the propagation routes of light rays. In FIGS. 5 and 6, all members, except for a disk D provided to an object, the relative rotation of which is to be detected, and members on the disk D, are separated from the disk D, and are fixed. The same reference numerals denote the same parts as in the above embodiments.

A divergent light beam emitted by a light source LGT such as an LED or the like is converted into a collimated light beam by a collimator lens LNS1, and the collimated light beam is irradiated onto the relatively rotating light-transmission disk D.

On the disk D, a transmission type phase radial diffraction grating GT1 prepared by glass etching or replica formation on the entire perimeter of the disk D, origin code patterns Z1 and Z2 formed by light transmission patterns near an origin position, and non-transmission absolute code patterns U, V, and W (FIG. 5) formed to indicate the angle information of the respective positions over the entire perimeter are recorded on circumferences (tracks) different each other. All these patterns are formed by phase type diffraction gratings such as lamellar phase gratings or the like. The collimated light beam has a beam size, in the radial direction of the disk D, large enough to illuminate the respective partial regions of the track of the radial grating GT1, the tracks of the origin code patterns Z1 and Z2, and the tracks of the absolute code patterns U, V, and W, as a whole.

A light-receiving element array SARY is constituted by incremental detection portions (light-receiving elements) SA, S$\overline{A}$, SB, and S$\overline{B}$, origin code detection portions (light-receiving elements) SZ1 and SZ2, and absolute code detection portions (light-receiving elements) SU, SV, and SW.

Assume that the radial diffraction grating GT1 has N lines per round of the disk.

From the radial diffraction grating GT1 (grating pitch P=2$\pi$/N radian) illuminated with the above-mentioned collimated light beam, two, ±1st-order diffracted light beams R+ and R− are generated. These two, ±1st-order diffracted light beams R+ and R− generate interference fringes (fringe pitch P=$\pi$/N radian) in a space slightly separated from the disk D as in the above embodiments. An amplitude grating GT2 (grating pitch P=π/N radian) arranged in this space selects a transmission region, and outputs transmitted light as contrast signal light, as described above.

In this embodiment, the amplitude grating GT2 is divided into four regions, as shown in FIG. 6, and grating lines are formed in these regions so that their arrangement phases are shifted by a ¼ pitch.

The phases of brightness and darkness of light emerging from these regions are shifted by a ¼ period.

Since the interference light components from these regions are incident on the corresponding light-receiving elements SA, SB, $\overline{SA}$, and $\overline{SB}$, the light-receiving elements SA, SB, $\overline{SA}$, and $\overline{SB}$ respectively generate sinusoidal analog signal currents which have 2N periods per revolution and are shifted from each other by a ¼ period. Using these four phase-shifted sinusoidal analog signals, a signal processing circuit (not shown) calculates the relative incremental rotation amount and rotation direction of the disk D. This calculation is known to those who are skilled in the art, and a detailed description thereof will be omitted.

On the other hand, the tracks on which the origin code patterns Z1 and Z2 on the disk D have no light transmittance on regions except for the portions of the origin code patterns Z1 and Z2, and even when the above-mentioned collimated light beam is incident on these non-transmission portions, no transmitted light is generated. When the disk D is rotated and reaches a position in the neighborhood of the origin position, and the above-mentioned collimated light beam is incident on the positions of the origin code patterns Z1 and Z2, the light beam is transmitted through these patterns and is incident on the light-receiving elements SZ1 and SZ2.

The origin code patterns Z1 and Z2 are arranged in correspondence with the radial positions on the disk of the light-receiving elements SZ1 and SZ2. When the origin code patterns Z1 and Z2 are illuminated with the above-mentioned collimated light beam, transmitted light with an amount corresponding to the circumferential position of the patterns is incident on the light-receiving elements SZ1 and SZ2. When the origin code patterns Z1 and Z2 move within the illumination region upon rotation of the disk D, the sectional area of transmitted light projected onto the light-receiving elements SZ1 and SZ2 changes. As a result, the total amount of light to be irradiated onto the light-receiving elements SZ1 and SZ2 changes. At this time, since the two patterns are arranged to be shifted from each other in the circumferential direction, the light amount changes at different timings on the light-receiving elements SZ1 and SZ2. Therefore, the light-receiving elements SZ1 and SZ2 generate mountain-shaped waveform analog signal currents with different peak timings upon rotation of the disk D. As an origin signal, a pulse signal may be generated, for example, when the outputs from the light-receiving elements SZ1 and SZ2 match each other. Such a pulse signal is generated by a signal processing circuit (not shown) that receives the outputs from the light-receiving elements SZ1 and SZ2. In this manner, origin passage of the disk D can be detected.

On the other hand, when the above-mentioned collimated light beam is irradiated onto the tracks where the absolute code patterns U, V, and W are present, transmitted light is intermittently projected onto the light-receiving elements SU, SV, and SW depending on whether or not light beam portions irradiated onto portions corresponding to the light-receiving elements extend over the absolute code patterns U, V, and W, i.e., depending on the transmission/non-transmission states of portions corresponding to the light-receiving elements on the absolute code pattern tracks. The light-receiving elements SU, SV, and SW generate absolute code signals corresponding to the current rotation position of the disk D, and the absolute position is specified by a signal processing circuit (not shown) on the basis of a combination of binary information. Since the way of specifying the absolute position is known to those who are skilled in the art, a detailed description thereof will be omitted.

In this manner, modulated light transmitted via the illuminated region on the disk is incident on the light-receiving element array SARY.

The diffraction grating GT1 used for detecting the incremental rotation amount by a method utilizing interference of diffracted light, and the patterns used for detecting other kinds of information (the absolute rotation position and origin position) associated with rotation by detecting the transmission/non-transmission states of light from the disk D in place of the above-mentioned method utilizing interference, are illuminated by a single illumination optical system as a whole, whereby a size reduction and simplification of the arrangement can be realized, thus attaining a further size reduction of the apparatus. In particular, the diffraction grating for the method utilizing interference of diffracted light from the disk D and the patterns for the method for detecting the transmission/non-transmission states of light from the disk D are illuminated by a collimated light beam as a whole, whereby as a whole-illumination using a single optical system can be attained even for different types of measurements and detections.

Note that the optical system of the embodiment shown in FIGS. 5 and 6 may be partially modified, so that light transmitted through the amplitude grating GT2, the origin code patterns Z1 and Z2, and the absolute code patterns U, V, and W may be projected onto the light-receiving element array SARY via a projection lens. With this arrangement, the resolutions of the edges of the absolute code patterns and the origin code patterns can be improved, thus further improving the detection precision.

In the arrangement of this embodiment, the radial diffraction grating GT1, the origin code patterns Z1 and Z2, and the absolute code patterns U, V, and W can have substantially the same phase grating structures, and hence, their manufacturing processes can be realized by only glass etching or replica formation and can be simplified. When lamellar gratings are used as phase gratings, steps can be similarly formed, and a glass etching process required in this case can be performed at the same time.

Figure 7:
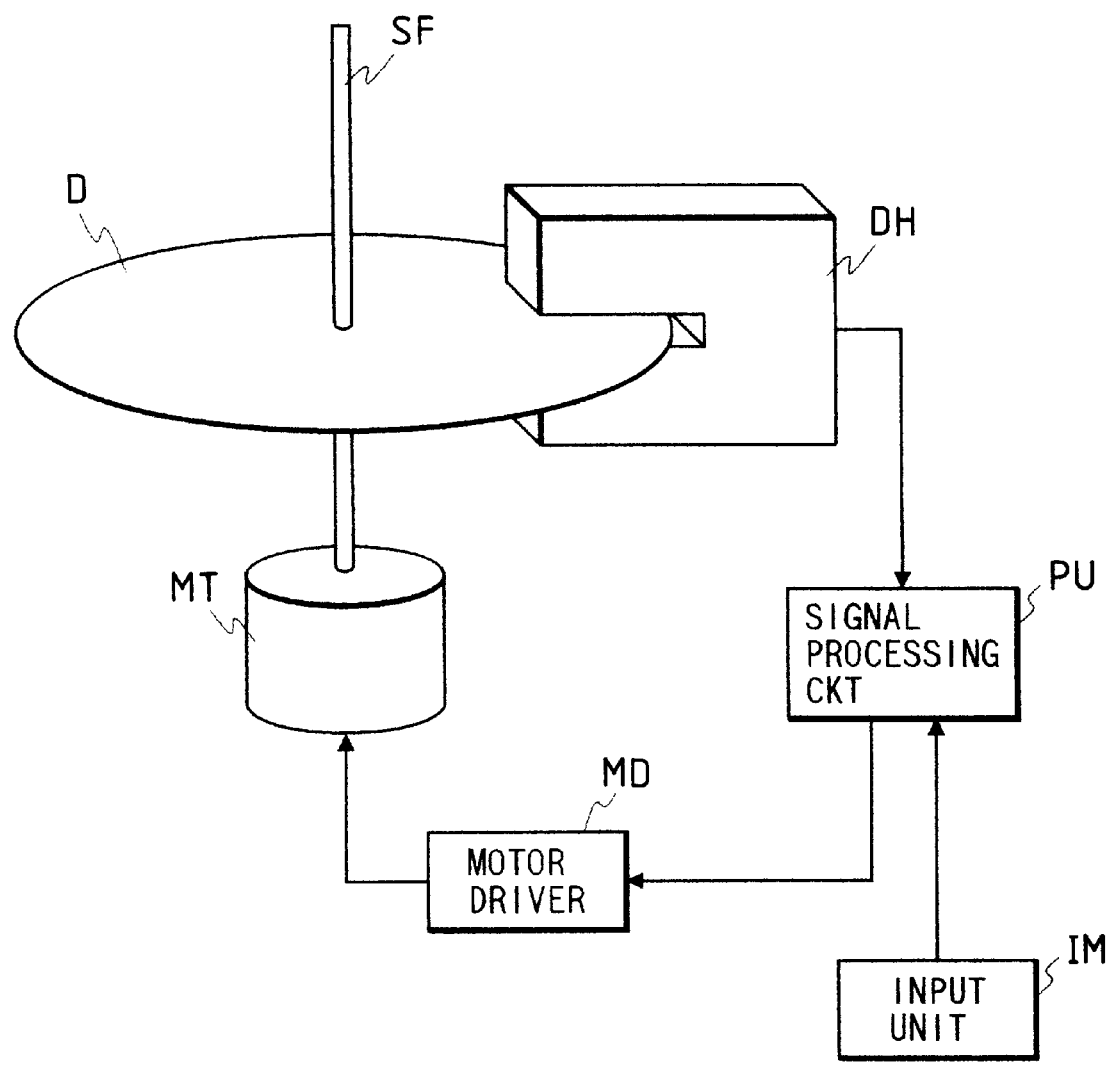
FIG. 7 is a schematic diagram showing a motor driver system according to the fourth embodiment of the present invention.

FIG. 7 is a schematic diagram of a motor driver system according to the fourth embodiment of the present invention. Referring to FIG. 7, a detection head DH houses all the optical components (from the light source LGT to the light-receiving element PD or light-receiving element array SARY) except for the disk D or the phase grating GT1 in one of the above-mentioned first to third embodiments. A signal processing circuit PU performs signal processing of the outputs from the light-receiving elements of the light-receiving element array SARY to perform measurement of the incremental rotation amount and rotation direction, measurement of the discrete rotation position, and detection of the origin, and to generate a control signal. An input unit IM performs a rotation instruction input to the signal processing circuit PU. A motor driver MD controls the drive operation of a motor MT upon reception of the control signal from the signal processing circuit PU. The motor MT has a shaft SF, which is rotated by the motor, and transmits a driving force to a portion to be driven (not shown).

The signal processing circuit PU generates a control signal on the basis of the outputs from the light-receiving element PD or the light-receiving elements of the light-receiving element array SARY, and the instruction input information from the input unit, thereby controlling the rotation of the shaft SF by the motor MT.

With the above-mentioned arrangement, the size of the detection head DH can be reduced, and a compact motor driver system can be realized.

In addition, extended applications of the optical system may be expected by the following modifications.

(1) The absolute code patterns U, V, and W may be changed to pure binary codes, gray codes, or the like in place of those for motor control.

(2) The number of divisions or the phase shift amount of the structure, which shifts the contrast change timings of the transmitted modulated light by shifting the phases by dividing the amplitude grating GT2 into a plurality of portions, may be changed (e.g., the amplitude grating may be divided into two patterns and the phases may be shifted by 90° between the two patterns, or the grating may be divided into six patterns and the phases may be shifted by 60° between the six patterns).

(3) The grating GT1 may be arranged on the apparatus main body side, and the grating GT2 may be arranged on the moving side.

(4) The grating GT2 may be replaced by other amplitude gratings (reflection slit grating, prism array grating) in place of the slit grating.

(5) In place of dividing the origin detection pattern into two patterns and detecting the origin position based on a difference signal of two signals, a method of detecting the peak of a correlation function obtained by superposing two random pitch patterns may be adopted.

(6) The transmission/non-transmission or reflection/non-reflection relationship of the absolute code patterns U, V, and W, and the origin code patterns Z1 and Z2 may be reversed.

(7) Information to be detected is not limited to rotation displacement information, but may be linear movement displacement information.

Figure 8:
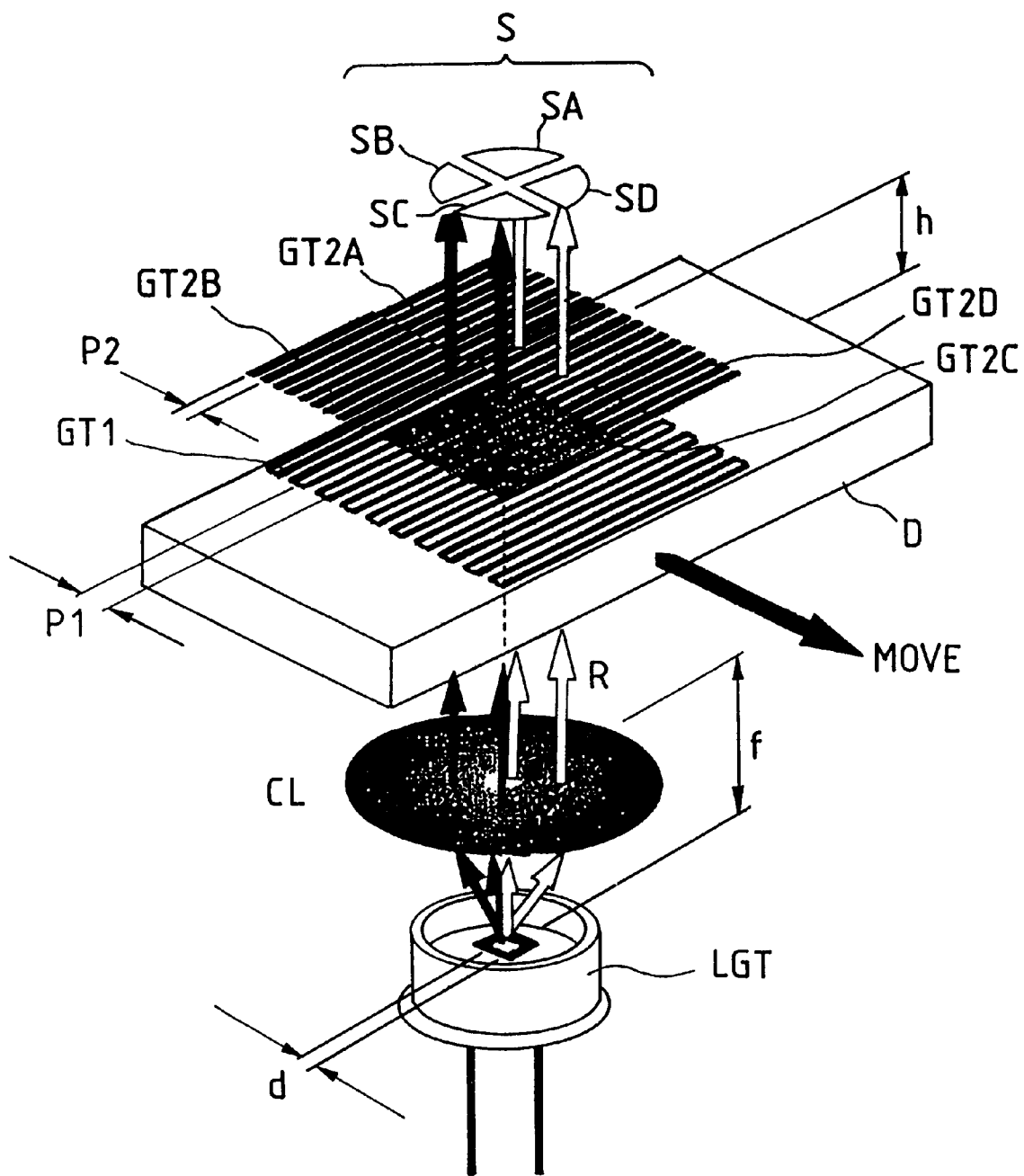
FIG. 8 is a schematic perspective view showing principal part of the fifth embodiment of the present invention.

FIG. 8 is a perspective view showing principal part of the fifth embodiment of the present invention. In this embodiment, the present invention is applied to a linear encoder for detecting linear displacement information of two objects (GT1, GT2) which move relative to each other.

Referring to FIG. 8, a light beam coming from a low-coherency light source LGT such as an LED or the like is converted into a collimated light beam R by a collimator lens CL, and is then irradiated onto a relatively moving (rotating) scale (first scale) D. Light beam components emitted from the central portion of a light-emitting portion of the LED will be explained below.

On the scale D, a transmission type phase grating GT1 (grating pitch P1) is recorded. The sectional shape of the phase grating corresponds to that of a lamellar grating, and the ratio of its concave and convex portions is 1:1. In this structure, a step difference $\Delta$ of the concave and convex portions is set to satisfy $\Delta = \lambda/(2 \times (n-1))$ (where n is the refractive index of the constituting material and $\lambda$ is the wavelength of the light source). Note that the amounts of light transmitted through the concave and convex portions are equal to each other.

The light beam entering the phase grating GT1 is transmitted therethrough and diffracted thereby, and diffracted light components of predetermined orders of the transmitted light interfere with each other. The interference light is incident on a second scale (not shown) provided with an amplitude grating (slit grating) GT2 having a grating pitch P2. Note that the first and second scales are opposed each other to have a gap h therebetween, which gap satisfies a condition to be described later. The amplitude grating GT2 comprises four amplitude gratings, i.e., two amplitude gratings GT2A and GT2B in which grating lines are arranged while shifting their phases by a ¼ period, and two amplitude gratings GT2C and GT2D which respectively have a phase difference of half the period from the gratings GT2A and GT2B.

Interference light based on diffracted light diffracted by the amplitude gratings GT2A to GT2D is received by a light-receiving means comprising four light-receiving elements SA, SB, SC, and SD, which are arranged in correspondence with the above-mentioned four gratings. Sinusoidal analog signals whose phases are shifted from each other by a ¼ period are obtained from the light-receiving elements SA, SB, SC, and SD. These four phase-shifted sinusoidal analog signals (incremental signals) are processed by a processing circuit (not shown) to obtain movement information such as a relative moving amount, moving direction, or the like between the first scale (phase grating GT1) and the second scale (amplitude grating GT2). As the signal processing method, for example, a method proposed by the present applicant in Japanese Laid-Open Patent Application No. 7-83612 may be used.

A method of setting the gap h between the first scale (phase grating GT1) and the second scale (amplitude grating GT2) in this embodiment will be explained below. In this embodiment, the phase of the surface wavefront of the collimated light beam transmitted through the transmission type phase grating GT1 is modulated (optically modulated) by the concave and convex portions of the phase grating. FIGS. 9A and 9B are explanatory views showing the phase modulation state of the surface wavefront of the collimated light beam incident on the phase grating GT1 by the concave and convex portions of the grating, and the distribution of light amount due to a change in surface wavefront as a gradation density.

Referring to FIGS. 9A and 9B, at a position slightly above the boundary portion between the concave and convex portions of the phase grating GT1, the optical path length difference between light beams from the concave and convex portions of the phase grating GT1 is zero. Therefore, at the position slightly above the boundary portion between the concave and convex portions, the surface wavefronts of light beams are superposed on each other by a phase difference of $\pi$ defined by the phase grating GT1 and interfere with each other. For this reason, when light beams from the concave and convex portions reach this position, a low light amount portion is generated due to interference.

When the light beams are separated farther away from the phase grating GT1 by a specific distance h0 and reach a position above the boundary portion between the concave and convex portions, the light beams from the concave and convex portions reach this position under the condition of an optical path length difference $\lambda$ due to diffraction phenomenon, and hence, they cancel each other by interference and become dark. At the position above the boundary portion between the concave and convex portions, since the optical path length difference is zero, as a matter of course, a low light amount portion is generated. The contrast of a contrast pattern formed at this position is very low.

When the light beams are separated farther away from the phase grating GT1 by a specific distance h1 and reach a position above the boundary portion between the concave and convex portions, the light beams from the concave and convex portions reach this position under the condition of an optical path length difference 0.5λ by the diffraction phenomenon, and hence, they enhance each other and become bright. At the position above the boundary portion between the concave and convex portions, since the optical path length difference is zero, as a matter of course, a low light amount portion is generated. The period of this contrast pattern is half the grating pitch P1 of the phase grating GT1, and the contrast pattern has a sinusoidal intensity distribution.

When the light beams are separated farther away from the phase grating GT1, interference between light components emerging from the concave and convex portions over a wide range frequently occurs, and the amount of light above the boundary portion between the concave and convex portions lowers considerably since these light components cancel each other due to their different phases. In the end, the sinusoidal contrast pattern disappears.

In this embodiment, as shown in FIG. 8, the stationary transmission type amplitude grating (slit grating) GT2 having a grating pitch P2=P1/2 is arranged at the position hi where the contrast pattern generated by the phase grating GT1 has the highest contrast.

At this time, the amplitude grating GT2 outputs transmitted light with a high contrast as sinusoidal contrast signal light. In this case, two periods of change in contrast occur per moving amount P1 of the scale D. In this embodiment, this transmitted light is detected by the light-receiving means S, thus obtaining the relative moving information between the phase grating GT1 and the amplitude grating GT2.

The gap h between the phase grating GT1 and the amplitude grating GT2 is set as follows. For example, if the grating pitch P1 of the scale is 20 μm, and the grating pitch P2 of the stationary grating is 10 μm, an encoder having a resolution of 10 μm is realized. At this time, since the gap between the scale and the stationary grating can be set to be about 200 μm, collision during relative movement of the scale hardly occurs.

This phenomenon will be described in detail below. The phase of the surface wavefront of a light beam emerging from the concave portion of the phase grating GT1 consisting of a refractive index medium is advanced by π from that of the convex portion with reference to the surface of the convex portion.

Each arcuated shape wa in FIGS. 9A and 9B represents the surface wavefront. Paying attention to the central light beam components from the concave and convex portions, an exit wavefront w1 from the concave portion and an exit wavefront w2 from the convex portion extend in an arcuated shape as they are separated away from the grating and interfere with each other. At the position above the boundary portion between the concave and convex portions, the surface wavefronts are superposed while being shifted by λ/2. That is, at the position above the boundary portion between the concave and convex portions, the light beam intensities are lowered due to interference, and the light beams become dark.

On the other hand, at a position above the concave portion, light beams regularly enhance or weaken each other by the surface wavefront from the convex portion. Similarly, at a position above the convex portion, light beams regularly enhance or weaken each other by the surface wavefront from the concave portion.

(a) At a position where the distance, h, from the surface (the surface of the convex portion) of the phase grating GT1 satisfies:

$$h=(P1^2-\lambda^2)/(4\pi) \quad (1)$$

the optical path length difference between a straight propagating light beam w1a component from the concave portion and an oblique propagating light beam w2b component from the convex portion becomes 0.5λ.

The phase of the surface wavefront of the light beam coming from the convex portion is given by:

$$2\pi \cdot h1/\lambda - \pi$$

and the phase of the surface wavefront of the light beam coming from the concave portion is given by:

$$2\pi\{h1+(0.5\lambda)\}/\lambda.$$

Therefore, the phase difference between the two light beams becomes 2π, and the two light beams enhance each other by interference, resulting in a maximal intensity.

At the same time, the optical path difference between a straight propagating light beam w2a component from the convex portion and an oblique propagating light beam w1b from the concave portion becomes λ/2.

The phase of the surface wavefront of the light beam coming from the convex portion is given by:

$$2\pi \cdot h1/\lambda$$

and the phase of the surface wavefront of the light beam coming from the concave portion is given by:

$$2\pi=h1+(0.5\lambda)\}/\lambda-\pi.$$

Therefore, the phase difference between the two light beams becomes 0, and the two light beams enhance each other by interference, resulting in a maximal intensity. As a result, the contrast pattern at the position h1 has a maximal contrast, and the contrast distribution has a sinusoidal pattern.

(b) At a position where the distance h from the surface (the surface of the convex portion) of the phase grating GT1 satisfies:

$$h=(P1^2-4\lambda^2)/(8\lambda)$$

the optical path length difference between the straight propagating light beam w1a component from the concave portion and the oblique propagating light beam w2b component from the convex portion becomes λ.

The phase of the surface wavefront of the light beam coming from the convex portion is given by:

$$2\pi \cdot h0/\lambda - \pi$$

and the phase of the surface wavefront of the light beam coming from the concave portion is given by:

$$2\pi(h0+\lambda)/\lambda.$$

Therefore, the phase difference between the two light beams becomes 3π, and the two light beams weaken each other by interference, resulting in a minimal intensity. At the same time, the optical path difference between the straight propagating light beam w2a from the convex portion and the oblique propagating light beam w1b from the concave portion becomes λ.

The phase of the surface wavefront of the light beam coming from the convex portion is given by:

$2\pi \cdot h0/\lambda$ and the phase of the surface wavefront of the light beam coming from the concave portion is given by:

$2\pi(h0+\lambda)/\lambda - \pi$.

Therefore, the phase difference between the two light beams becomes π, and the two light beams weaken each other by interference, resulting in a minimal intensity. As a result, the contrast pattern at the position h0 has a minimal contrast.

(c) At a position where the distance h from the surface (the surface of the convex portion) of the phase grating GT1 satisfies:

$h = (P1^2 - 9\lambda^2)/(12\lambda)$ the optical path length difference between the straight propagating light beam w1a component from the concave portion and the oblique propagating light beam w2b component from the convex portion becomes 1.5λ.

The phase of the surface wavefront of the light beam coming from the convex portion is given by:

$2\pi \cdot h1/\lambda - \pi$ and the phase of the surface wavefront of the light beam coming from the concave portion is given by:

$2\pi\{h1+(1.5\lambda)\}/\lambda$.

Therefore, the phase difference between the two light beams becomes 4π, and the two light beams enhance each other by interference, resulting in a maximal intensity. At the same time, the optical path difference between the straight propagating light beam w2a from the convex portion and the oblique propagating light beam w1b from the concave portion becomes 1.5λ.

The phase of the surface wavefront of the light beam coming from the convex portion is given by:

$2\pi \cdot h1/\lambda$ and the phase of the surface wavefront of the light beam coming from the concave portion is given by:

$2\pi\{h1+(1.5\lambda)\}/\lambda - \pi$.

Therefore, the phase difference between the two light beams becomes 2π, and the two light beams enhance each other by interference, resulting in a maximal intensity. However, due to the influence of interference between light beams from neighboring concave and convex portions, the maximal contrast position of the contrast pattern at this position h2 is shifted, and the contrast distribution does not have a sinusoidal pattern.

Therefore, in this embodiment, if $(P1^2-4\lambda^2)/(8\lambda)<h$ is satisfied, a practical contrast can be obtained. More specifically, the gap h is set to satisfy equation (1) above.

In this connection, if the light beam from the light source LGT has a wavelength λ=0.66 μm, and the phase grating GT1 has a pitch P1=25 μm, the distances h1 and h0 are respectively:

h1=236 μm, h0=118 μm.

That is, when the gap from the amplitude grating GT1 is set to be h1, a maximum contrast can be obtained.

Light components emitted from the peripheral portion of the light-emitting portion of the LED will be explained below. As in the light beam components emitted from the central portion of the LED, the phase of the surface wavefront of a collimated light beam R transmitted through the transmission type phase grating GT1 is modulated by the concave and convex portions of the grating. In this case, the light beam propagates slightly obliquely depending on the focal length, f, of the collimator lens CL and the shift amount from the center of the light-emitting portion.

FIGS. 10A and 10B are explanatory views showing the phase modulation state of the surface wavefront of the collimated light beam incident on the phase grating GT1 by the concave and convex portions of the grating, and the distribution of light amount due to a change in surface wavefront as a gradation density.

As shown in FIGS. 10A and 10B, at a position slightly above the boundary portion between the concave and convex portions of the phase grating GT1, since the optical path length difference between light beams from the concave and convex portions of the phase grating GT1 is zero, the surface wavefronts of light beams are superposed on each other by a phase difference of π defined by the phase grating GT1 and interfere with each other. For this reason, a low light amount portion is generated due to interference.

When the light beams are separated farther away from the phase grating GT1 by a specific distance h0 and reach a position above the boundary portion between the concave and convex portions, the light beams from the concave and convex portions reach this position under the condition of an optical path length difference λ by the diffraction phenomenon, and hence, they cancel each other by interference and become dark. At the position above the boundary portion between the concave and convex portions, since the optical path length difference is zero, as a matter of course, a low light amount portion is generated. The contrast of a contrast pattern formed at this position is very low.

When the light beams are separated farther away from the phase grating GT1 by a specific distance h1 and reach a position above the boundary portion between the concave and convex portions, the light beams from the concave and convex portions reach this position under the condition of an optical path length difference 0.5λ by the diffraction phenomenon, and hence, they enhance each other and become bright. At the position above the boundary portion between the concave and convex portions, since the optical path length difference is zero, as a matter of course, a low light amount portion is generated. The period of this contrast pattern is half the grating pitch P1 of the phase grating GT1, and the intensity of the contrast pattern has a sinusoidal distribution.

When the light beams are separated farther away from the phase grating GT1, interference between light components emerging from the concave and convex portions over a wide range frequently occurs, and the amount of light above the boundary portion between the concave and convex portions lowers considerably since these light components cancel each other due to their different phases. As a result, the sinusoidal contrast pattern disappears.

Figure 11:
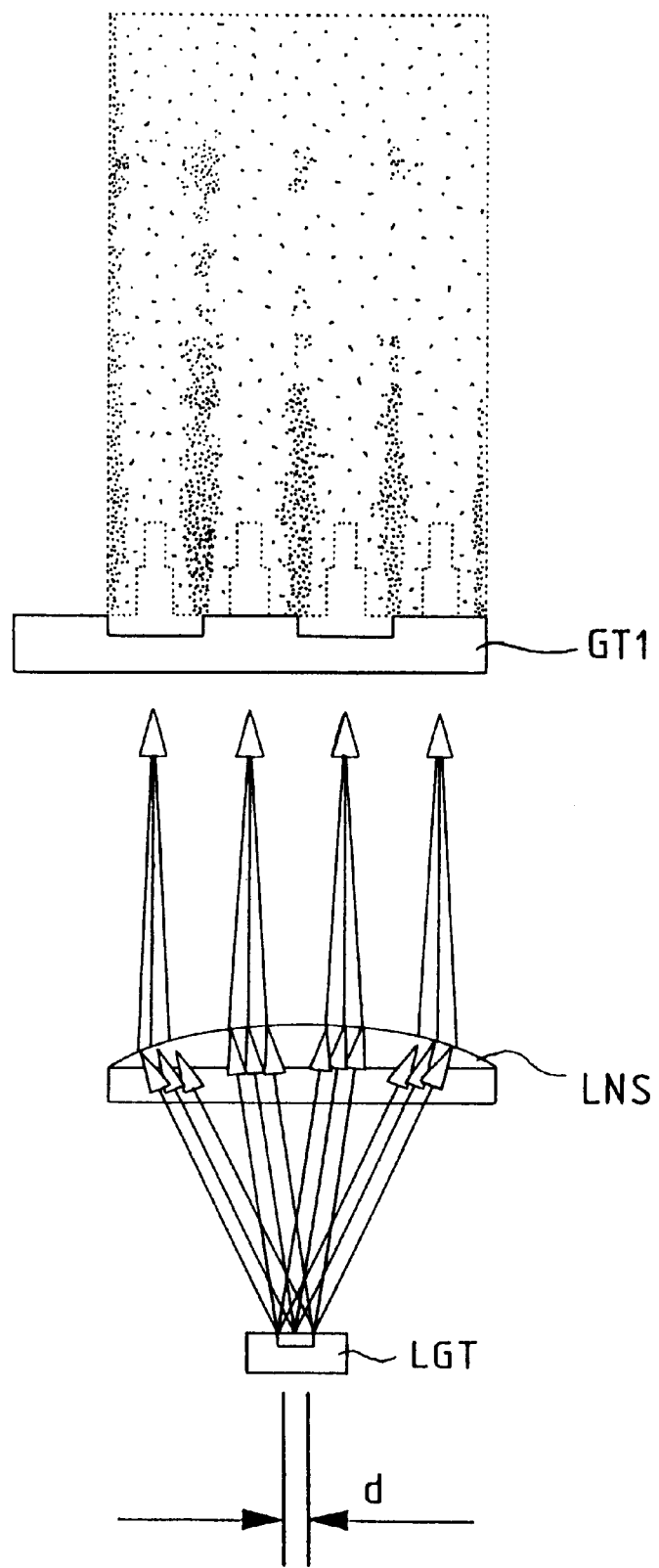
FIG. 11 is an explanatory view of generation of an intensity distribution due to light transmitted through the phase grating shown in FIG. 8.

Upon comparison between FIGS. 9A and 9B, and FIGS. 10A and 10B, interference fringes shift in a space separated by the distance of the gap h1. This shift amount s is determined by the gap h and the inclination of the oblique propagating light beam. Therefore, the contrast of interference fringes projected onto a space periodically changes but lowers considerably as the spatial position is separated farther away from the phase grating GT1, as shown in FIG. 11 which shows the distribution of light amount as gradation densities, as in FIG. 10B.

The modulated contrast of transmitted light obtained when the slit grating GT2 is arranged at the position of the gap h lowers as the shift amount s becomes larger. When the shift amount becomes ½ the interference fringe pitch, the contrast becomes zero.

When the intensity distribution of the interference fringes in the space is given by:

$$I = \Sigma(\sin(\pi x/P1))^2$$

and the LED light-emitting portion emits light with a substantially uniform illuminance, the intensities of bright and dark fringes are:

$$\text{Dark Fringe: } I_{\min} = \int_{-s/2}^{+s/2} (\sin(\pi x/P1))^2 \, dx$$

$$\text{Bright Fringe: } I_{\max} = \int_{-s/2}^{+s/2} (\cos(\pi x/P1))^2 \, dx$$

where P1 is the period ($\mu$m) of the concave and convex portions of the grating GT1. Assuming that the practical contrast is 0.3 or higher, i.e.:

$$\text{Contrast} = (I_{\max} - I_{\min})/(I_{\max} + I_{\min})$$
$$= (P1/2\pi d)\sin(2\pi d/P1)$$
$$= 0.3$$

the shift amount is about 0.375 P.

More specifically, the shift amount s of the interference fringes in the slit grating GT2 arrangement space must fall within an allowable range of ±0.375P/2.

If the focal length of the collimator lens is represented by f and the light-emitting portion size (the length in the arrangement direction of grating lines of the diffraction grating GT1) of a surface light-emitting element such as an LED or the like is represented by d ($\mu$m), the relationship with the shift amount s is:

$$s:h = d:f,$$

From this relationship, $$d = f \cdot s/h,$$

Therefore, the allowable range of the light-emitting element size that allows a contrast=0.3 is:

$$d \leq 0.375 \cdot f \cdot P1/h$$

In this embodiment, the design value falls within this range. In this connection, if an optimal gap h used when a point light source is used is given by:

$$h = (P1^2 - \lambda^2)/(4\lambda)$$

and the light source to be used has a central wavelength $\lambda = 0.66$ $\mu$m and the diffraction grating GT1 has a pitch P1=25 $\mu$m, the gap h is:

h=236.6 $\mu$m.

Furthermore, if the focal length f of the collimator lens is determined to be f=2,000 $\mu$m, the allowable range of the size d is:

d≤79.2 $\mu$m.

If $d = 0.5 \cdot f \cdot P1/h$, the contrast in the space becomes 0 in principle. Note that the light source size d is the length of the arrangement direction component of the grating GT1 when the light-emitting portion has a rectangular, square, or elliptic shape.

Figure 12:
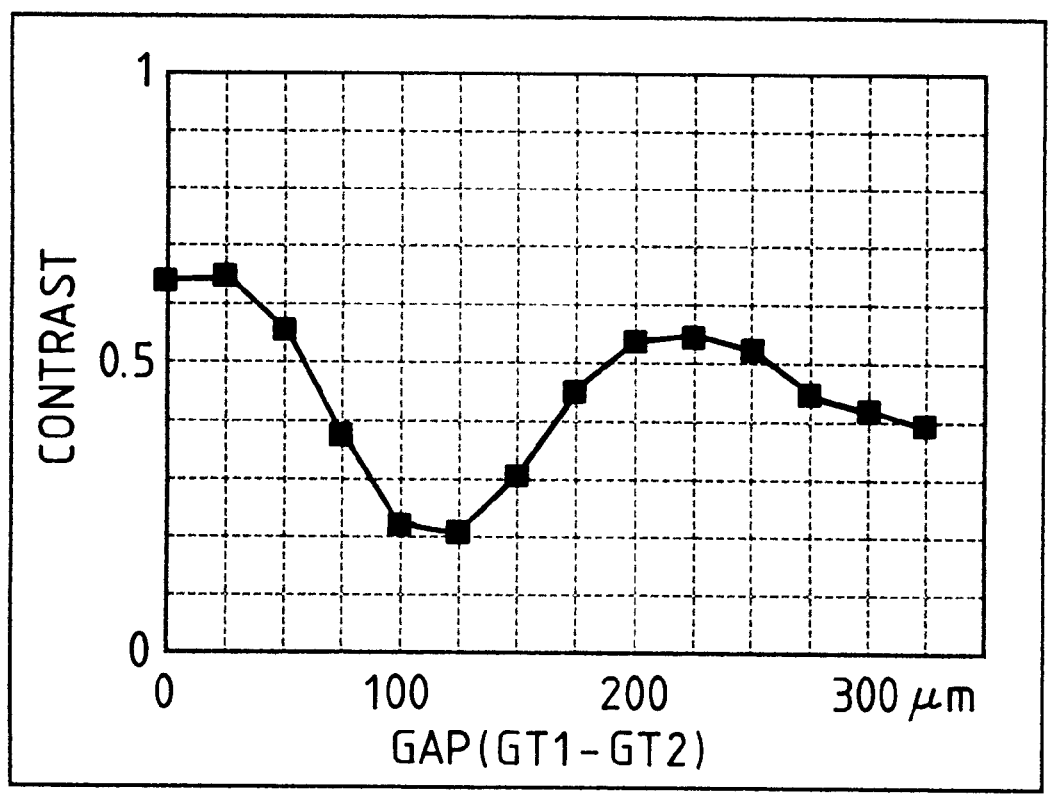
FIG. 12 is an explanatory view of an example of the measurement of signal light contrast according to the fifth embodiment of the present invention.

FIG. 12 shows an example of the measurement results of the contrast of transmitted modulated light from a slit grating obtained by changing the distance between the phase grating GT1 and the amplitude grating GT2 using an encoder prepared by utilizing the above-mentioned phenomena. Note that the light source has a wavelength $\lambda = 0.66$ $\mu$m, the light-emitting portion has a size of 20 $\mu$m×20 $\mu$m, and the focal length of the collimator lens is 2 mm. The minimum and maximum positions of contrast roughly match those in the above description.

In this embodiment, as described above, spatial interference light with a high contrast is obtained by setting the gap h between the phase grating GT1 and the amplitude grating GT2 to satisfy equation (1) above, and adjusting the light source size. Thus, relative displacement information between the first scale (phase grating GT1) and the second scale (amplitude grating GT2) is detected with high precision.

In this embodiment, even when the gap h between the phase grating GT1 and the amplitude grating GT2 does not perfectly satisfy equation (1), if the gap h therebetween is set to satisfy:

$$0.7 \times \frac{P1^2 - \lambda^2}{4\lambda} < h < 1.3 \times \frac{P1^2 - \lambda^2}{4\lambda} \tag{2}$$

an intensity pattern with a relatively high contrast can be obtained, and the object of the present invention can be substantially attained.

In this embodiment, the respective elements may be constituted as follows.

(A1) The phase grating GT1 and the amplitude grating GT2 may be respectively replaced by a radial phase grating recorded on a relatively rotating disk, and a radial amplitude grating, and a rotary encoder may be constituted by a combination of these gratings.

(A2) The structure for shifting the contrast change timings of transmitted modulated light by shifting phases by dividing the amplitude grating GT2 into a plurality of portions may be modified.

(A3) The phase grating GT2 may be fixed, and the amplitude grating GT2 may be moved.

(A4) The amplitude grating GT2 may be replaced by other amplitude gratings (reflection slit grating, prism array grating) in place of the slit grating.

(A5) The phase grating GT1 may be replaced by a grating given a periodic distribution of refractive index in place of the lamellar grating defined by concave and convex portions.

What is claimed is:

1. An apparatus for obtaining displacement information relative to a member, comprising:

a light source for illuminating a phase type diffraction grating on the member;

an amplitude grating arranged at a position where interference fringes are generated immediately after emerging of diffracted light from said phase type diffraction grating, wherein said interference fringes being generated from the diffracted light emerging from one area of said phase type diffraction grating illuminated with one beam by said light source, wherein the member on which said phase type diffraction grating is provided being opposite to a member on which said amplitude grating is provided; and a light-receiving element for receiving light emerging from said amplitude grating, said light-receiving element generating a periodic signal as displacement information upon relative movement of the member.

2. An apparatus according to claim 1, wherein both said amplitude grating and said phase type diffraction grating are arranged in a circumferential direction, and said light-receiving element generates the periodic signal as rotation displacement information upon relative rotation of the member.

3. An apparatus according to claim 2, wherein a number of grating lines per round of said amplitude grating is twice a number of grating lines per round of said phase type diffraction grating.

4. An apparatus according to claim 2, wherein the number of grating lines per round of said amplitude grating is equal to the number of grating lines per round of said phase type diffraction grating.

5. An apparatus according to claim 1, wherein a grating pitch of said amplitude grating is half a grating pitch of said phase type diffraction grating.

6. An apparatus according to claim 1, wherein a grating pitch of said amplitude grating is equal to a grating pitch of said phase type diffraction grating.

7. An apparatus according to claim 1, further comprising a recording portion detection system for detecting light from a predetermined data recording portion of the member so as to detect the displacement information of the member.

8. An apparatus according to claim 7, wherein said recording portion detection system detects absolute displacement information and/or origin position information of the member as the displacement information of the member by detecting the light from the predetermined data recording portion of the member.

9. An apparatus according to claim 1, wherein said light-receiving element is arranged to receive light transmitted through said amplitude grating.

10. An apparatus for relatively driving a member, comprising:
   a driving system for relatively driving the member;
   a light source for illuminating a phase type diffraction grating on the member;
   an amplitude grating arranged at a position where interference fringes are generated immediately after emerging of diffracted light from said phase type diffraction grating, wherein said interference fringes being generated from the diffracted light emerging from one area of said phase type diffraction grating illuminated with one beam by said light source, wherein the member on which said phase type diffraction grating is provided being opposite to a member on which said amplitude grating is provided;
   a light-receiving element for receiving light transmitted through said amplitude grating, said light-receiving element generating a periodic signal as displacement information upon relative movement of the member; and
   a control system for controlling a drive operation of said driving system on the basis of the periodic signal.

11. An apparatus for obtaining displacement information relative to a member, comprising:
   a light source for illuminating a phase type diffraction grating arranged on the member and having a grating pitch P1 with a light beam of a wavelength $\lambda$;
   an amplitude grating arranged at a position where diffracted light emerges from said phase type diffraction grating, wherein said interference fringes being generated from the diffracted light emerging from one area of said phase type diffraction grating illuminated with one beam by said light source, wherein the member on which said phase the diffraction grating is provided being opposite to a member on which said amplitude grating is provided; and
   a light-receiving element for receiving light transmitted through said amplitude grating, said light-receiving element generating a periodic signal as the displacement information upon relative movement of the member,
   wherein a gap h between said phase type diffraction grating and said amplitude grating is set to satisfy:

$(P1^2 - 4\lambda^2)/(8\lambda) < h.$

12. An apparatus according to claim 11, said phase type diffraction grating having a sectional shape defined by concave and convex portions, and being set so that a phase difference between light beams obtained via the concave and convex portions is $\lambda/2$.

13. An apparatus according to claim 11, wherein $P1 = 2 \cdot P2$ where P2 is the grating pitch of said amplitude grating.

14. An apparatus according to claim 11, wherein both said phase type diffraction grating and said amplitude grating comprise radial gratings, said light-receiving elements obtains an incremental signal on the basis of modulated light obtained via said phase type diffraction grating and said amplitude grating, and said phase type diffraction grating and said amplitude grating satisfy $N1 = N2/2$ where N1 and N2 are respectively the numbers of grating lines per round of said phase type diffraction grating and said amplitude grating.

15. An apparatus for obtaining displacement information relative to a member, comprising:
   a light source for illuminating a phase type diffraction grating arranged on the member and having a grating pitch P1 with a light beam of a wavelength $\lambda$;
   an amplitude grating arranged at a position where diffracted light emerges from said phase type diffraction grating, wherein said interference fringes being generated from the diffracted light emerging from one area of said phase type diffraction grating illuminated with one beam by said light source, wherein the member on which said phase type diffraction grating is provided being opposite to a member on which said amplitude grating is provided; and
   a light-receiving element for receiving light transmitted through said amplitude grating, said light-receiving element generating a periodic signal as the displacement information upon relative movement of the member,
   wherein a gap h between said phase type diffraction grating and said amplitude grating is set to satisfy:

$$0.7 \times \frac{P1^2 - \lambda^2}{4\lambda} < h < 1.3 \times \frac{P1^2 - \lambda^2}{4\lambda}.$$

16. An apparatus according to claim 15, said phase type diffraction grating having a sectional shape defined by concave and convex portions, and being set so that a phase difference between light beams obtained via the concave and convex portions is $\lambda/2$.

17. An apparatus according to claim 15, wherein $P1 = 2 \cdot P2$ where P2 is the grating pitch of said amplitude grating.

18. An apparatus according to claim 15, wherein both said phase type diffraction grating and said amplitude grating comprise radial gratings, said light-receiving elements obtains an incremental signal on the basis of modulated light obtained via said phase type diffraction grating and said amplitude grating, and said phase type diffraction grating and said amplitude grating satisfy N1=N2/2 where N1 and N2 are respectively the numbers of grating lines per round of said phase type diffraction grating and said amplitude grating.

19. An apparatus for obtaining displacement information relative to a member, comprising:

an illumination system for illuminating a phase type diffraction grating arranged on the member and having a grating pitch P1 with a light beam of a wavelength λ, said illumination system comprising a surface light-emitting element and a collimator lens;

an amplitude grating arranged at a position where diffracted light emerges from said phase type diffraction grating, wherein said interference fringes being generated from the diffracted light emerging from one area of said phase type diffraction grating illuminated with one beam by said light source, wherein the member on which said phase type diffraction grating is provided being opposite to a member on which said amplitude grating is provided; and a light-receiving element for receiving light transmitted through said amplitude grating, said light-receiving element generating a periodic signal as the displacement information upon relative movement of the member, wherein a gap h between said phase type diffraction grating and said amplitude grating is set to satisfy:

$$d \leq 0.375 \cdot f \cdot P1/h$$

where d is the length of a component, in a grating arrangement direction, of said phase type diffraction grating, and f is the focal length of said collimator lens.

20. An apparatus comprising:

a light source;

a first member on which a phase type diffraction grating adapted to be illuminated by a light emitted from said light source is provided;

a second member on which an amplitude grating is provided, said second member being arranged to be opposite to said first member so that said amplitude grating is arranged at a position where interference fringes are generated immediately after emerging of diffracted light from said phase type diffraction grating, wherein said interference fringes being generated from the diffracted light emerging from one area of said phase type diffraction grating illuminated with one beam by said light source; and a light-receiving element for receiving light emerging from said amplitude grating, said light-receiving element generating a periodic signal as displacement information upon relative movement between said first and second members.

21. An apparatus according to claim 20, wherein both said amplitude grating and said phase type diffraction grating are arranged in a circumferential direction, and said light-receiving element generates the periodic signal as rotation displacement information upon relative rotation of the member.

22. An apparatus according to claim 21, wherein a number of grating lines per round of said amplitude grating is twice a number of grating lines per round of said phase type diffraction grating.

23. An apparatus according to claim 21, wherein the number of grating lines per round of said amplitude grating is equal to the number of grating lines per round of said phase type diffraction grating.

24. An apparatus according to claim 20, wherein a grating pitch of said amplitude grating is half a grating pitch of said phase type diffraction grating.

25. An apparatus according to claim 20, wherein a grating pitch of said amplitude grating is equal to a grating pitch of said phase type diffraction grating.

26. An apparatus according to claim 20, further comprising a recording portion detection system for detecting light from a predetermined data recording portion of the member so as to detect the displacement information of the member.

27. An apparatus according to claim 26, wherein said recording portion detection system detects absolute displacement information and/or origin position information of the member as the displacement information of the member by detecting the light from the predetermined data recording portion of the member.

28. An apparatus according to claim 20, wherein said light-receiving element is arranged to receive light transmitted through said amplitude grating.

29. An apparatus comprising:

a light source;

a first member on which a phase type diffraction grating adapted to be illuminated by a light emitted from said light source is provided;

a second member on which an amplitude grating is provided, said second member being arranged to be opposite to said first member so that said amplitude grating is arranged at a position where interference fringes are generated immediately after emerging of diffracted light from said phase type diffraction grating, wherein said interference fringes being generated from the diffracted light emerging from one area of said phase type diffraction grating illuminated by one beam by said light source;

a light-receiving element for receiving light emerging from said amplitude grating, said light-receiving element generating a periodic signal as displacement information upon relative movement between said first and second members; and a position control system for controlling a relative position between said first and second members on the basis of the periodic signal.

* * * * *

UNITED STATES PATENT AND TRADEMARK OFFICE
CERTIFICATE OF CORRECTION

PATENT NO. : 5,956,140

DATED : September 21, 1999

INVENTOR(S) : KOU ISHIZUKA, ET AL.

It is certified that error appears in the above-identified patent and that said Letters Patent is hereby corrected as shown below:

COVER ITEM
[54] TITLE
  "CONSTRUCTED" should read --CONSTRUCTION--.

COLUMN 1:

TITLE, "CONSTRUCTED" should read --CONSTRUCTION--.

COLUMN 2:

Line 21, "part" should read --parts--.

COLUMN 3:

Line 20, "interfere" should read --interfere with--.

COLUMN 4:

Line 47, "different" should read --different from--.

UNITED STATES PATENT AND TRADEMARK OFFICE
CERTIFICATE OF CORRECTION

PATENT NO. : 5,956,140

DATED : September 21, 1999

INVENTOR(S) : KOU ISHIZUKA, ET AL.

It is certified that error appears in the above-identified patent and that said Letters Patent is hereby corrected as shown below:

COLUMN 8:

Line 4, "opposed" should read --opposed to--.
   Line 49, "GT1" should read --GT1,--.

COLUMN 16:

Line 5, "phase the" should read --phase type--.

Signed and Sealed this

Eleventh Day of July, 2000

Attest:

Q. TODD DICKINSON

*Attesting Officer*         *Director of Patents and Trademarks*